May 23, 1939. J. W. WATSON 2,159,919
MOTION DAMPING MECHANISM
Filed Oct. 12, 1935 3 Sheets-Sheet 1

Inventor:—
John Warren Watson
by his Attorneys
Howson & Howson

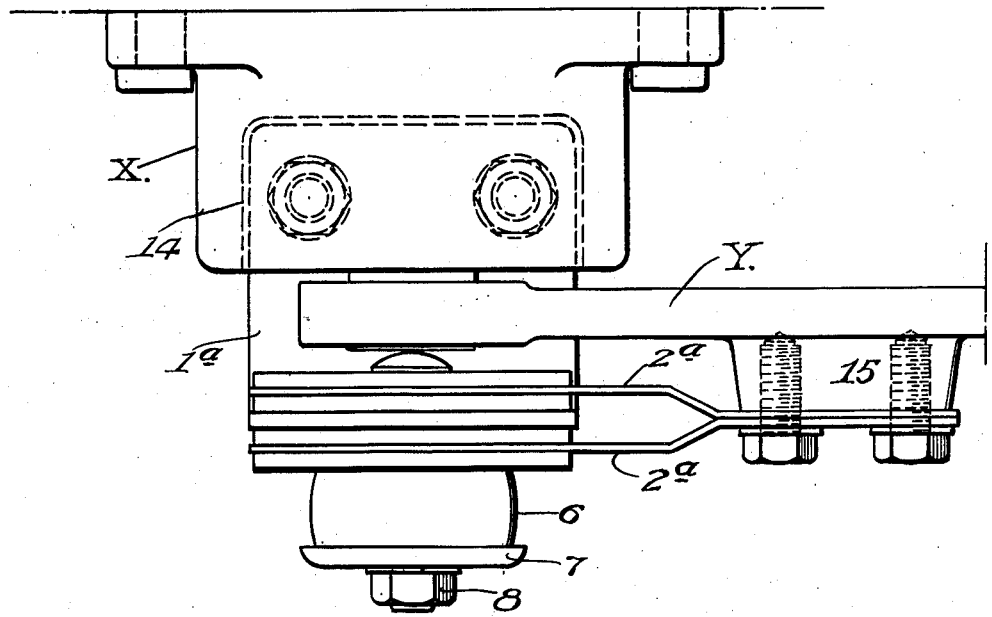
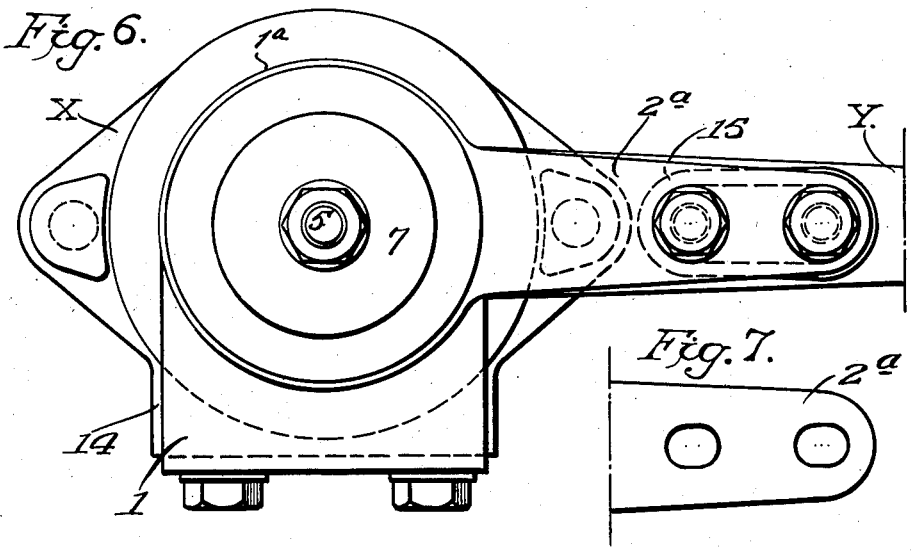

May 23, 1939.   J. W. WATSON   2,159,919
MOTION DAMPING MECHANISM
Filed Oct. 12, 1935   3 Sheets-Sheet 3

Inventor:—
John Warren Watson
by his Attorneys
Howson & Howson

Patented May 23, 1939

2,159,919

UNITED STATES PATENT OFFICE 2,159,919

MOTION DAMPING MECHANISM

John Warren Watson, Wayne, Pa., assignor to John Warren Watson Company, Philadelphia, Pa., a corporation of Pennsylvania Application October 12, 1935, Serial No. 44,787

4 Claims. (Cl. 188—130)

This invention relates to a novel combination for damping, controlling or regulating relative oscillations between two elements which are joined together to form an oscillating joint, and in particular relates to a damping mechanism employing dry friction to cooperate with, and augment the damping resistance produced by, a hydraulic shock absorber.

A particular object of my invention is to provide a friction damping mechanism which may be attached to and operated by or in connection with existing parts or surfaces of a hydraulic shock absorber.

A further object of the invention is to provide a character of damping resistance which is at present lacking in the damping resistance produced by hydraulic shock absorbers.

A further object of the invention is to produce a frictional damping resistance which operates outside of the hydraulic housing, away from the liquid employed, and which utilizes dry friction as the resistance medium.

A further object of the invention is to provide a mechanism which is easily attachable to an existing shock absorber or readily incorporated in the manufacture of a hydraulic shock absorber, and, also, one which may be readily detached or disassembled from the shock absorber to facilitate the making of any necessary repairs or replacements.

A further and particular object of the invention is to provide a damping mechanism, the relatively oscillatable parts of which are held to maintain their axial alignment without dependence, one upon the other.

A further particular object of the invention is to provide an oscillating damping mechanism to be carried by a second oscillating mechanism in such manner that the parts of the two shall be caused to oscillate about a common axis.

A further very particular object of this invention is to provide a damping mechanism which contains no bearings or bushings or other relatively movable and contacting parts other than the friction producing surfaces themselves.

Another object is to provide a damping mechanism which is readily adjustable to provide any amount of frictional damping resistance required.

Various combinations of elements and different means could readily be employed to obtain the results secured by the embodiments disclosed without departing from the spirit and scope of this invention, the illustrations herewith being merely by way of example.

One embodiment of this invention is shown by Figs. 1, 2, 3 and 4. Fig. 1 is a plan view showing the invention attached to a conventional hydraulic shock absorber, the attachments being made to the base of the shock absorber between it and the car frame (the car frame is not shown), and to the arm of the shock absorber.

The embodiment shown in the above figures is one for ready attachment to an existing shock absorber without any changes or alterations thereto.

Figs. 5, 6 and 7 show the same embodiment of the invention but with modified attaching means which might be employed if the use of the invention were contemplated by the builder of the shock absorber.

Fig. 5 is a plan view showing the invention rigidly attached to the body and arm of a shock absorber.

Fig. 6 is a front elevation showing this modified method of attachment.

Fig. 7 is a fragmentary view featuring merely the elongated form of holes in the damper arms 2a.

Figure 1:
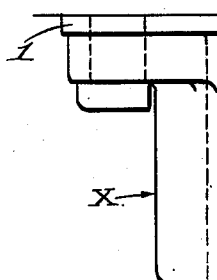
Figure 4:
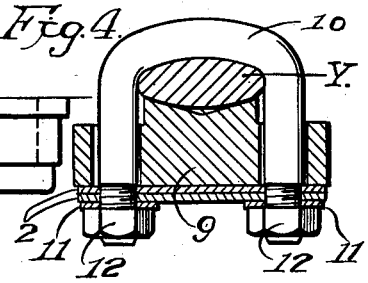
Fig. 4 is a cross section on line 4—4 Fig. 1, showing in detail the attachment to the shock absorber arm.
Figure 2:
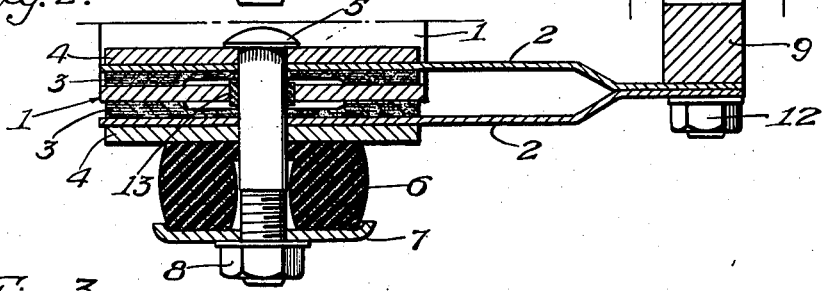
Fig. 2 is a cross section of this embodiment of the invention taken on line 2—2 Fig. 3.
Figure 3:
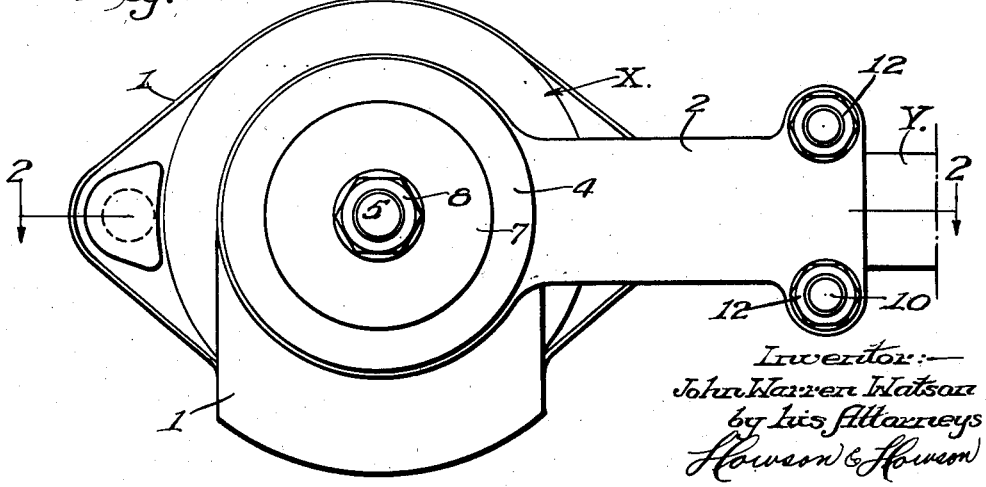
Fig. 3 is a front elevation of the invention attached to the shock absorber.
Figure 8:
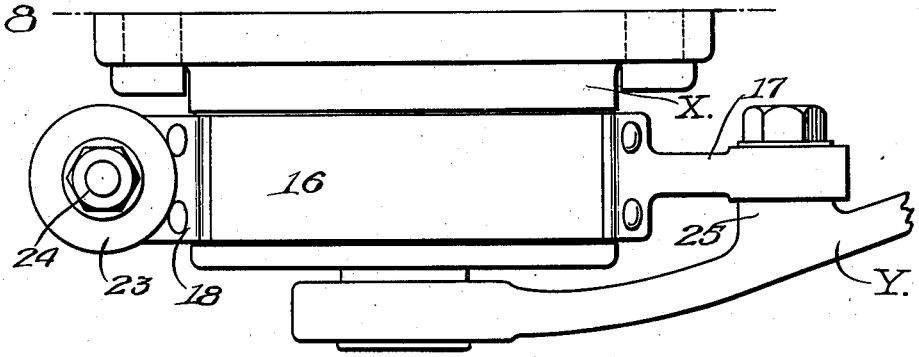
Figure 9:
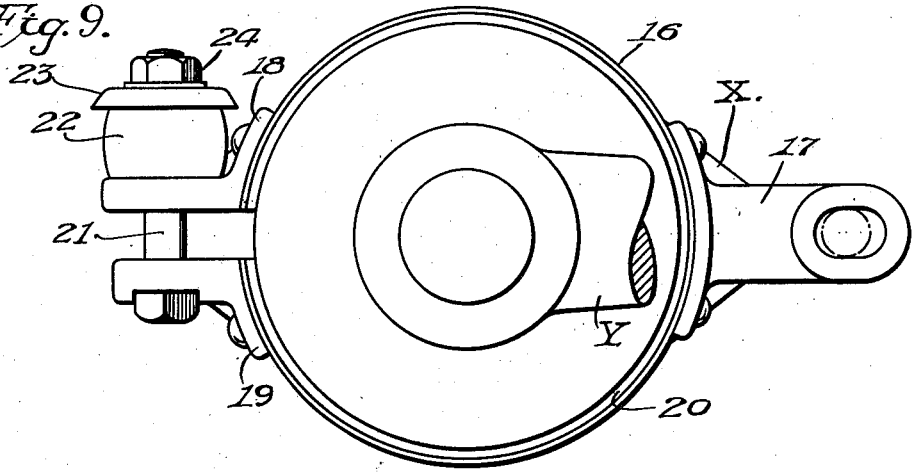

Figs. 8 and 9 show a different embodiment of the invention which might also be employed if its use were contemplated by the builder of the shock absorber.

Figure 10:
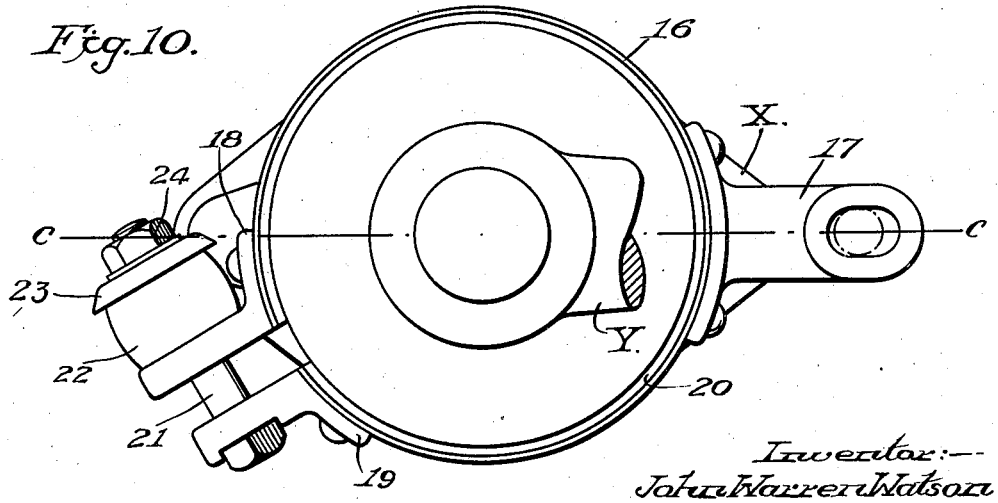

Fig. 10 shows a modification of the embodiment shown in Figs. 8 and 9, which provides for greater damping in one direction of movement than in the other.

Referring to Figs. 1, 2, 3 and 4, X and Y represent the body and arm respectively of a hydraulic shock absorber which are joined together in a conventional manner to form an oscillating joint. Secured to body X is a bracket member 1 which at one end bends up to fit and be bolted between body X and a car frame, using the same bolts which existed to bolt the body X directly against the car frame. At its other end, the bracket member 1 also bends upward to form the central and stationary frictional member of the damping mechanism. Between the arms 2, 2 and the two flat surfaces of this upward projection of bracket member 1 are two floating discs 3, 3 of any suitable friction material. The central portions of these discs are recessed, as shown, in order to keep their frictional contact as uniformly as possible away from the axis in order that the frictional resistance produced may be as uniform as possible. Against the outer surfaces of arms 2, 2 are load-distributing washers 4, 4. These parts 2, 2 3, 3 4, 4 are held together in axial alignment by means of bolt 5. 6 is a thick washer of soft rubber or other suitable resilient material. 7 is a cup shaped washer, and 8 is a nut for the purpose of deforming rubber washer 6 for causing more or less pressure between the frictionally opposed parts. At its neck, bolt 5 is provided with small serrations (not shown) to hold it in firm relation with the innermost load-distributing washer 4 to thus prevent its being turned with nut 8 while adjustments are being made. The arms 2, 2 come together at their outer ends and both are securely fastened to shock absorber arm Y by means of the V-block 9, U-bolt 10, lock washers 11, and nuts 12. Thus fastening the damper arms to the shock absorber arm at two points, results in all three arms being held together as immovably, relative to each other, as though welded. This means that the inner or circular ends of the damper arms are thus firmly held and maintained in axial alignment with the axis of oscillation between body X and arm Y. Thus is eliminated any need for a bearing or bushing between the damper arms or, rather the bolt 5, and the stationary bracket member 1. With these co-acting frictional parts thus independently held in axial alignment, it follows that during operation of the damper there is no strain other than a torsional strain, put upon the bracket member 1. Also, with this elimination of the need for bearings or bushings no rattles can ever be produced. From the foregoing it will be noted that members 2, 2 4, 4 5, 6, 7 and 8 all oscillate as a fixed unit with relation to bracket member 1. Between bolt member 5 and the somewhat larger central hole in bracket member 1 is placed a small bushing 13 of soft rubber. The purpose of this bushing is merely to keep the 4—5—6—7—8 assembly in more or less concentric relation with the bracket member 1 before and while installation of the damper is being made.

Referring to Figs. 5 and 6 it will be noted that the only difference between this embodiment and that shown in Figs. 1, 2, 3 and 4 lies in the method of attaching the modified bracket 1a to the body X and the modified arms 2a, 2a to the arm Y. In this embodiment shown in Figs. 5 and 6 the shock absorber body X is provided with an integral boss 14 and the shock absorber arm Y is provided with an integral boss 15 to which the bracket 1a and the arms 2a, 2a are respectively, securely and rigidly attached. The arms 2a, 2a, as shown in the fragmentary view, Fig. 7, are provided with elongated holes to allow compensation for manufacturing tolerances in the matter of drilling the holes in bosses 14 and 15.

Referring to Figs. 8 and 9, X and Y represent the body and arm respectively of a conventional shock absorber. 16 is a split, flexible band to which is attached, as for example by rivets, arm 17 and lugs 18 and 19. Within band 16, and preferably held with relation to band 16 as for example by means of rivets (rivets not shown) is a liner 20 of any suitable friction material. This liner engages and is held in position with relation to the shock absorber body X by means of a track or runway machined around the outside of the body. By means of bolt 21, compressible rubber member 22, cup washer 23 and nut 24 any desired pressure may be set up between band and liner members 16 and 20 and the machined circular track. Arm member Y is provided with a boss 25 to which is securely attached the arm member 17. As will be seen in Fig. 9 this arm member is provided at its end with an elongated form of hole to allow compensation for tolerances in the manufacture of the various parts. This elongated form of hole also permits the taking of a new grip on the arm from time to time to compensate for wear on that portion of liner member 20 which is adjacent to arm 17. In this embodiment of the invention it is not necessary to provide a two point attachment of the damper arm to the shock absorber arm, as the axial alignment of the opposed frictional surface is, as will readily be seen, otherwise maintained.

Fig. 10 shows a modification of the embodiment shown in Figs. 8 and 9, wherein the band 16 and the liner 20 are split, away from the center line c—c, in order to give greater damping action for one direction of movement than for the opposed direction. This split may be made below or above the center line and at any distance from the center line in order to provide any wanted division or allotment of damping work.

Many uses of this invention will present themselves and may be advantageously employed where it is desired to take advantage of maximum simplicity in the damping or controlling of the relative oscillations of two elements which are joined together about a common axis to form an oscillating joint. Contrary to conventional practice in providing this nature of damping control, all bearings and bushings and joints and pivots are eliminated. This new note of simplicity is accomplished by the novel plan of having the opposed frictional members oscillate about the same common axis with the joint members. Thus designed to oscillate about this same common axis, it is made possible to carry the opposed frictional members in fixed relation, instead of jointed relation, respectively, with the joint elements. And being in fixed relation with the joint elements, it follows that the axial alignment of each of the opposed frictional members is maintained without the aid of the other. Thus, by this invention the need for any and all bearing and bushing or other wearing pivot parts has been done away with.

The use of my invention in connection with hydraulic shock absorbers is of particular advantage owing to the present and increasing trend toward softer and softer springs in motor car construction. With the use of these softer springs, the up and down movements of the body are much slower and hence more comfortable than they were when relatively stiffer springs were used. For the sake of both comfort and safety however the extent of these slow motions must be controlled and limited. The control and limiting of these movements is particularly desirable on the front end of the car. Front stability and controllability is particularly important in these days of faster driving and more crowded highways. Hydraulic shock absorbers cannot be adjusted to offer resistance to these slow body movements without at the same time offering a too stubborn resistance to the lightning like speed of road-following axle movements. The resistance offered by a hydraulic shock absorber increases as the square of the speed of its movement and therefore in order not to cause a veritable hydraulic lock-up during these lightning like axle movements it is necessary to keep the orifice adjustment pretty well opened up. And thus opened up, practically no resistance whatsoever is provided against the slow up and down movements and swaying of the body. The ever-present frictional drag or damping action produced by the present invention is precisely correct for taking up this inefficiency of a hydraulic device by firmly controlling these otherwise uncontrolled slow movements.

While I have illustrated and described preferred forms of construction for carrying my invention into effect, these are capable of variations and modifications without departing from the spirit and scope of the invention. I therefore do not wish to be limited to the precise details of construction set forth but desire to avail myself of such variations and modifications as come within the scope of the appended claims.

Having thus described my invention, what I claim and desire to protect by Letters Patent of the United States is:

1. For combination with a hydraulic shock absorber, and to complement the function of said shock absorber in controlling relative movements between the sprung and unsprung portions of a vehicle two frictionally opposed surfaces in positive fixed relation respectively with the body portion of the shock absorber and with a relatively movable part of said shock absorber, and resilient means for causing pressure between said frictionally opposed surfaces.

2. For combination with a hydraulic shock absorber, and to complement the function of said shock absorber in controlling relative movements between the sprung and unsprung portions of a vehicle two frictionally opposed dry surfaces in fixed relation respectively with the body portion of the shock absorber and with a relatively oscillatable part of said shock absorber, and resilient means for causing pressure between said frictionally opposed surfaces.

3. For combination with a hydraulic shock absorber, and to complement the function of said shock absorber in controlling relative movements between the sprung and unsprung portions of a vehicle two frictionally opposed surfaces respectively in positive fixed relation with and relatively actuated by two relatively movable parts of said shock absorber, means for causing pressure between said frictionally opposed surfaces, the relative actuation of said frictionally opposed surfaces being accomplished independently of the hydraulic resistance within the shock absorber.

4. For combination with a hydraulic shock absorber, and to complement the function of said shock absorber in controlling relative movements between the sprung and unsprung portions of a vehicle two frictionally opposed dry surfaces respectively in positive fixed relation with and relatively actuated by two relatively movable parts of said shock absorber, means for causing pressure between said frictionally opposed surfaces, the relative actuation of said frictionally opposed surfaces being accomplished independently of the hydraulic resistance within the shock absorber.

JOHN WARRREN WATSON.